Sept. 3, 1935.  J. E. LILIENFELD  2,013,564
ELECTROLYTIC CONDENSER
Filed Aug. 29, 1931
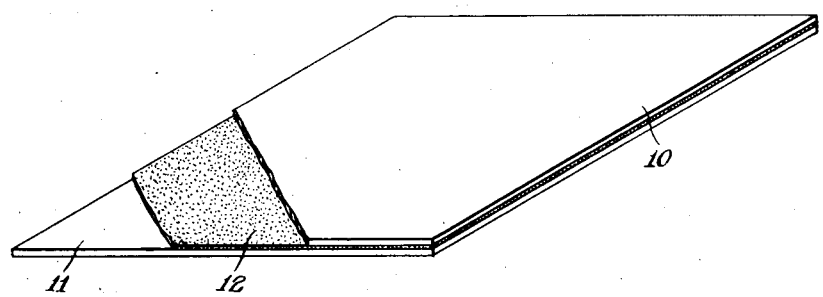
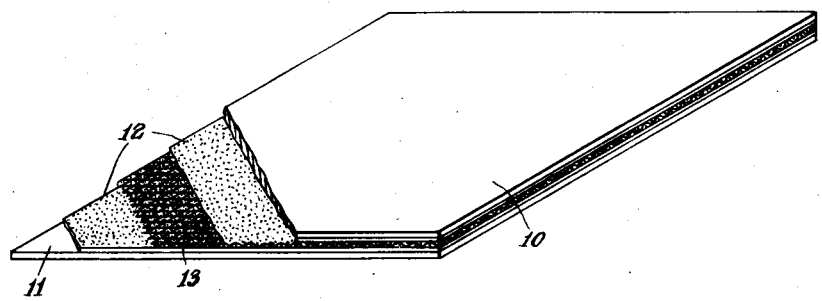
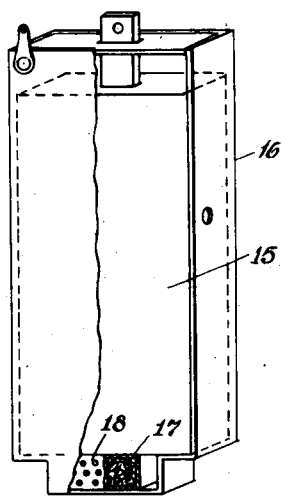
INVENTOR
JULIUS EDGAR LILIENFELD
BY
ATTORNEY Patented Sept. 3, 1935

2,013,564

UNITED STATES PATENT OFFICE 2,013,564

ELECTROLYTIC CONDENSER

Julius Edgar Lilienfeld, Winchester, Mass., assignor to Ergon Research Laboratories, Inc., a corporation of Delaware Application August 29, 1931, Serial No. 560,140

5 Claims. (Cl. 175—315)

The invention relates to an electrolyte for use with filming metals or electrodes, as in electrolytic condensers, and lending itself for use in liquid, semi-liquid or pasty condition.

The invention has for an object the provision of an electrolyte in which electrodes may be formed and in which their behavior with respect to leak, deterioration, etc. will be far superior to their behavior in the usual known electrolytes used in electrolytic condensers, for example, in such electrolytes as borax and boric acid, boric acid with small amount of borax, etc. The novel electrolyte is thus particularly suitable for such use, as well as in the preparation of insulation layers generally.

A further object of the invention resides in the provision of an electrolyte having a low freezing point, which property is of especial value where an electrolytic condenser is to be used under low temperature conditions of the surrounding atmosphere.

A still further object of the invention resides in the provision of a novel electrolyte composition which is of a highly viscous and hygroscopic (non-drying) nature and suitable for use, furthermore, with or without separator elements between electrodes inasmuch as, in the case of narrowly spaced plates, its viscosity is sufficient to prevent a short-circuiting contact between the plates. Another object is to maintain the electrolyte composition at the desired degree of saturation.

Electrolytes of a more or less viscous nature have heretofore been employed, for example, glycerine which is a trihydric alcohol. Such electrolytes are objectionable for various reasons, among which is the fact that they do not possess to a sufficient degree forming properties, and, therefore, when utilized in a condenser they materially reduce, if not totally suppress, the highly desirable self-healing property of the electrolytic condenser.

Furthermore, the use of these electrolytes does not admit of the application of as high voltages to the condensers as in the case of condensers utilizing the novel electrolyte.

I have found, however, that certain condensation products of polyhydric alcohols with, preferably, a weak acid and particularly compounds of dihydric alcohols with a weak mineral or organic acid afford a particularly satisfactory electrolyte, the latter being both of a highly viscous nature and possessing forming properties so that in the use of the same leaks are extremely small and the deterioration rate of the film or electrode layer very low.

A further object of the invention resides in the provision of a paste involving the addition of a very finely divided filler such as metallic dust, lamp black, graphite, starch, diatomaceous earth, the dust of regenerated or not regenerated cellulose, etc. to a viscous electrolyte in desired amounts for increasing its consistency.

The foregoing objects are attained in the use of a more or less liquid composition comprising condensation products of polyhydric alcohols such as a glycol (triethylene glycol), or compounds thereof, with a weak mineral or organic acid, such as boric acid, the polymerization being effected preferably in the presence of a catalyst, such as zinc chloride. Such condensation products are of a highly viscous, sticky, non-drying nature, soluble in water. I have discovered that they possess to a marked degree forming properties to provide an insulating layer on a filming metal such as aluminum, tantalum, etc., a property that renders the said condensation product suitable for use as a forming electrolyte. Electrodes may be formed in situ when this composition is utilized as the electrolyte therefor.

While these products afford a satisfactory electrolyte per se, in some cases it may be advantageous to change their viscosity and/or their specific resistance by adding a small amount of distilled water with the possible further addition of boric acid, borax or other ionogen dissolved therein.

Furthermore, in order to secure the proper consistency and coherence of said electrolyte, compounds of the character described may be mixed therewith, a more liquid one being added to a highly viscous or solid electrolyte. There also may be added a filler to suit so that a sticky, non-flowing, pasty mass is obtained which may be applied to an electrode in any suitable manner. For example, it may be sprayed, brushed, or spread thereon to provide for a separating or spacing medium as well as the electrolyte.

The nature of the invention, however, will best be understood when described in connection with the accompanying drawing, in which:

Fig. 1 is a perspective view illustrating one application of the novel electrolyte, as between the electrodes of a flat plate condenser.

Fig. 2 is a similar view illustrating a modification.

Fig. 3 is a perspective view, with portion broken away, of a condenser embodying the novel electrolyte, and provided with means for maintaining a definite partial pressure of water vapor in proximity to the electrolyte.

Referring to the drawing, 10 and 11 designate metallic electrodes of a condenser, for example, strips of a film-forming metal, such as aluminum, and 12 an intermediate layer of the novel electrolyte which serves, when prepared in paste form as hereinafter set forth, to space said electrodes as well as affording the electrolyte for the condenser. Or, the condenser may be made up in the manner more particularly set forth in my copending application for U. S. Letters Patent, Serial No. 560,142, filed of even date herewith, and especially when the anodic electrodes embody the novel type of formed film set forth in my copending application for U. S. Letters Patent, Serial No. 560,141, also filed of even date herewith.

This electrolyte is of a highly viscous and relatively hygroscopic nature, and in some instances is prepared of sufficient consistency to require no further means for retaining it in its relationship to the plates and thus eliminating separators to prevent direct contact of an anode with its cathode.

If desired, however, an intermediate spacer member of retiform or textural material may be utilized for retaining the electrolyte, such as the piece of mesh cloth 13, Fig. 2. This spacer element is located then between the said electrodes in the usual manner and the electrolyte incorporated therewith.

It may be desirable, also, to maintain a definite amount of moisture in the novel electrolyte composition and not rely upon the accidental atmospheric humidity. For example, there may be provided in proximity to the condenser 15, Fig. 3, means to afford a surrounding humid atmosphere, as by encasing the condenser in a suitable substantially air-tight envelope or container 16 and enclosing therewith a saturated solution of a highly hygroscopic salt in water, such as of sodium chlorid, calcium chlorid, etc. A salt of this nature will serve to establish in the container 16 a definite partial pressure of vapor, and it is preferably held or soaked up by a spongy absorbing substance such as charcoal, cotton, sponge or the like 17 retained in a perforated receptacle 18 or humidor and located, for example, at the bottom of container 16. Or, other provision may be made to maintain the moisture as in installations where air is circulated in the cooling of a condenser, in the case of large AC capacitors, where the humidity of this cooling air may first be increased in any well known or special manner, as in passing it over salts of the aforesaid nature.

In some instances, it may be advantageous to change the viscosity and/or specific resistance of said condensation product of an alcohol by adding thereto a small amount, 8%, of distilled water with possible addition of boric acid, borax or other ionogen dissolved therein, for example, up to 14% by weight of a saturated boric acid solution. The proper consistency of the electrolyte may thus be secured, a liquid compound being added to a highly viscous or solid electrolyte to suitably reduce its consistency.

Also, small amounts of the novel electrolyte may be added to standard electrolytes generally utilized in condensers, such as borax solutions with boric acid, boric acid solutions, etc., where it is desired to improve idling properties by reducing the deterioration rate of the condenser. Moreover, the addition of such novel electrolyte may serve as an agent to depress the freezing point of the mixture.

Furthermore, to enhance the consistency of the electrolyte and mixture, there may be added in the desired quantity aluminum or copper dust, etc. or finely subdivided carbon as lampblack and activated charcoal, or an insulating dust as diatomaceous earth, regenerated or not regenerated cellulose dust, as well as a mixture of a conducting filler with an insulating filler, which will be suspended therein and give the electrolyte a very firm body to convert it into a thick paste. This allows of its being conveniently spread, as by a suitable spreading machine, upon the electrodes to be coated, or brushed thereon by hand using a tool similar to a spatula; or, it may be otherwise applied, as through the use of a spray gun.

Where a high forming electrolytic paste is not required, there may be substituted for the condensation product glycerine or like more or less viscous material as solutions of gums (gum arabic), which latter are forming but have a tendency to dry, with boric acid (preferably with the addition of a small amount of borax) and the dust as a filler. Of course, in the case of glycerine if the insulating electrode layer is injured in any way, it is not then self-healing and the condenser retains a bad spot. However, a non-flowing pasty electrolyte is obtained which is useful for certain purposes.

As a result of the use of the particular forming electrolyte mentioned and one which embodies also appreciable viscosity, I have found that the condenser is protected against cumulative local ionization and break-down is thus retarded; also, deterioration of the layers is obviated through reduction of the temperature motion of the layer molecules, and it is possible to reduce the critical biasing voltage in the case of AC operation. Furthermore, condensers may be constructed without utilizing separator members between the electrodes through the preparation of a paste from the electrolyte.

Also, in the choice of a suitable conductive filler material, such as lamp black, platinum black, etc. which does not polarize, the conductivity of the separator mixture may be appreciably enhanced and the power factor decreased. Moreover, a much larger proportion of such filler material may be added than in the case of polarizable metal fillers and thus admit of preparing mixtures of high viscosity, in fact, mixtures which are substantially non-flowing.

It is to be noted, therefore, that when mixed with the novel viscous condensation product, conducting fillers will reduce the power factor slightly, except lamp black which reduces it considerably even in the case of higher audio-frequencies. However, the admixture of conducting fillers lowers the sparking voltage, while insulating fillers do not affect the sparking voltage but increase the power factor.

Attention is called to my copending application Ser. No. 711,286, filed February 14, 1934, as a continuation in part hereof, now Patent No. 1,986,779.

I claim:

1. As an electrolyte for use with filmed electrodes, a highly viscous reaction product of triethylene glycol and boric acid.

2. A composition of matter consisting of a highly viscous reaction product of a glycol and boric acid with 8% by weight of a saturated solution of boric acid in water and finely subdivided carbon.

3. The combination with a condenser having a viscous hygroscopic electrolyte, of a substantially air-tight envelope for the condenser, a perforated receptacle mounted within the envelope, and a water-absorbent material retained therein and saturated with water for affording moisture to the electrolyte.

4. The combination with a condenser having a viscous hygroscopic electrolyte, of a substantially air-tight container for the condenser, and a saturated aqueous solution of a highly hygroscopic salt within the container and distinct from the electrolyte for maintaining a humid atmosphere in contact with the latter.

5. As an electrolyte for use between condenser electrodes, a highly viscous hygroscopic reaction product of a glycol and boric acid, and a small added amount of an aqueous solution of boric acid.

JULIUS EDGAR LILIENFELD.